US007439499B2

(12) United States Patent
Bailey et al.

(10) Patent No.: US 7,439,499 B2
(45) Date of Patent: Oct. 21, 2008

(54) MULTIPLE ELECTROSPRAY PROBE INTERFACE FOR MASS SPECTROMETRY

(75) Inventors: Thomas H. Bailey, Sunnyvale, CA (US); James E. Tappan, Sunnyvale, CA (US)

(73) Assignee: Metara, Inc., Sunnyvale, CA (US)

( * ) Notice: Subject to any disclaimer, the term of this patent is extended or adjusted under 35 U.S.C. 154(b) by 185 days.

(21) Appl. No.: 11/386,389

(22) Filed: Mar. 22, 2006

(65) Prior Publication Data

US 2007/0221837 A1 Sep. 27, 2007

Related U.S. Application Data

(60) Provisional application No. 60/547,281, filed on Feb. 23, 2004.

(51) Int. Cl.
*H01J 49/26* (2006.01)
*H01J 49/04* (2006.01)
*G01N 11/00* (2006.01)

(52) U.S. Cl. .................. 250/288; 250/285; 250/423 R; 250/425

(58) Field of Classification Search .................. 250/288
See application file for complete search history.

(56) References Cited

U.S. PATENT DOCUMENTS

| | | | | |
|---|---|---|---|---|
| 6,501,073 | B1 * | 12/2002 | Mylchreest et al. | 250/288 |
| 6,803,568 | B2 * | 10/2004 | Bousse et al. | 250/288 |
| 6,822,231 | B2 * | 11/2004 | Schultz et al. | 250/288 |
| 6,902,938 | B1 * | 6/2005 | Cody | 436/174 |
| 2002/0009727 | A1 * | 1/2002 | Schultz et al. | 435/6 |
| 2002/0110902 | A1 * | 8/2002 | Prosser et al. | 435/287.1 |
| 2002/0195555 | A1 * | 12/2002 | Weinberger et al. | 250/281 |
| 2003/0193020 | A1 * | 10/2003 | Van Berkel | 250/288 |
| 2005/0145787 | A1 * | 7/2005 | Prosser et al. | 250/288 |
| 2006/0169030 | A1 * | 8/2006 | Stewart et al. | 73/53.01 |
| 2007/0221837 | A1 * | 9/2007 | Bailey et al. | 250/288 |

* cited by examiner

*Primary Examiner*—David A. Vanore
*Assistant Examiner*—Bernard Souw
(74) *Attorney, Agent, or Firm*—Jonathan W. Hallman; MacPherson Kwok Chen & Heid LLP

(57) ABSTRACT

In one embodiment, an analytical apparatus is provided that includes a carriage; and a plurality of electrospray probes pivotably mounted on the carriage, wherein movement of the carriage engages a feature with a selected one of the electrospray probes whereby movement of the feature pivots the selected one of the electrospray probes with respect to the carriage.

16 Claims, 5 Drawing Sheets

MULTIPLE ELECTROSPRAY PROBE INTERFACE FOR MASS SPECTROMETRY

CROSS REFERENCE TO RELATED APPLICATIONS

This application claims priority to International Application PCT/US05/058303, filed Feb. 23, 2005, which in turn claims the benefit of U.S. Provisional Application No. 60/547,281, filed Feb. 23, 2004, the contents of both of which are incorporated by reference.

TECHNICAL FIELD

The present invention relates generally to chemical analysis, and more particularly to an electrospray probe interface for mass spectrometry.

BACKGROUND

Automated systems for measuring the concentration of analytes in a sample have been developed using a number of analytical techniques such as chromatography or mass spectrometry. In particular, mass spectrometry is often the technique of choice to achieve sensitivity of parts per billion (ppb) or sub-ppb such as parts per trillion (ppt). For example, co-assigned U.S. Ser. No. 10/004,627 (the '627 application), issued as U.S. Pat. No. 6,974,951, discloses an automated analytical apparatus measuring contaminants which may be present in trace concentrations or constituents which may be present in substantial concentrations using a form of In-Process Mass Spectrometry (IPMS).

In an IPMS technique, a sample of interest is spiked, i.e., has added to it a known amount of the appropriate isotopic species or an internal standard. After the spike and sample have equilibrated, the mixture is ionized using an atmospheric pressure ionization (API) technique such as electrospray and processed in a mass spectrometer to determine a ratio measurement. Depending upon the composition of the spike, the ratio will either be an altered isotopic ratio as used in isotope dilution mass spectrometer (IDMS) or the ratio of an internal standard to the analyte of interest. Unlike the harsh ionization using in inductively coupled mass spectrometry (ICP-MS), the mild ionization provided by the use of API enables the characterization of complex molecules rather than just elemental species. Because a ratio measurement is used, the analysis is immune to drift and other such inaccuracies that plague conventional mass spectrometry analyses.

The IPMS technique represents a dramatic improvement over conventional mass spectrometry methods. Whereas conventional mass spectrometry methods require considerable hands-on intervention from highly-trained analytical chemists, IPMS is completely automated. Because of this automation, IPMS may be used to characterize analytes in fields such as semiconductor clean rooms where the use of mass spectrometry would traditionally be inappropriate. Moreover, this automation may be used to characterize virtually any type of analyte one may be interested in—from elemental species (which may be mono-isotopic) to complex molecular species. However, this automation faces a bottleneck at an electrospray probe used for electrospray ionization. Before a new analysis may be completed, the electrospray probe must be rinsed and then conditioned with the newly-equilibrated spike/sample solution. Having been conditioned, the probe may be used in the characterization of an analyte of interest in the newly-equilibrated spike/sample solution. This delay complicates the analysis of, for example, a copper plating solution in a semiconductor bath in which a user may desire to know the concentrations of a number of plating accelerants, retardants, constituents, and contaminants. To measure each one of these analytes thus entails an appreciable amount of delay because of the associated rinse and conditioning cycles.

Accordingly, there is another need in the art for an improved IPMS apparatus that reduces the delay associated with repetitive rinse and conditioning cycles.

SUMMARY

In accordance with the present invention, an analytical apparatus includes: a carriage; and a plurality of electrospray probes pivotably mounted on the carriage, wherein movement of the carriage engages a feature with a selected one of the electrospray probes whereby movement of the feature pivots the selected one of the electrospray probes with respect to the carriage.

In accordance with another aspect of the invention, a method of using an electrospray assembly including a plurality of electrospray probes mounted on a carriage includes the acts of: conditioning a selected one of the electrospray probes; moving the carriage such that a feature engages the selected one of the electrospray probes; and moving the feature such that the selected one of the electrospray probes pivots into a mass spectrometer bore.

In accordance with another aspect of the invention, an analytical apparatus is provided that includes: a plurality of electrospray probes; means for moving the plurality of electrospray probes such that a selected one of the electrospray probes is positioned with respect to an mass spectrometer bore; and means for moving the selected one of the electrospray probes into the mass spectrometer bore.

BRIEF DESCRIPTION OF THE DRAWINGS

Use of the same reference symbols in different figures indicates similar or identical items.

DETAILED DESCRIPTION

Figure 1A:
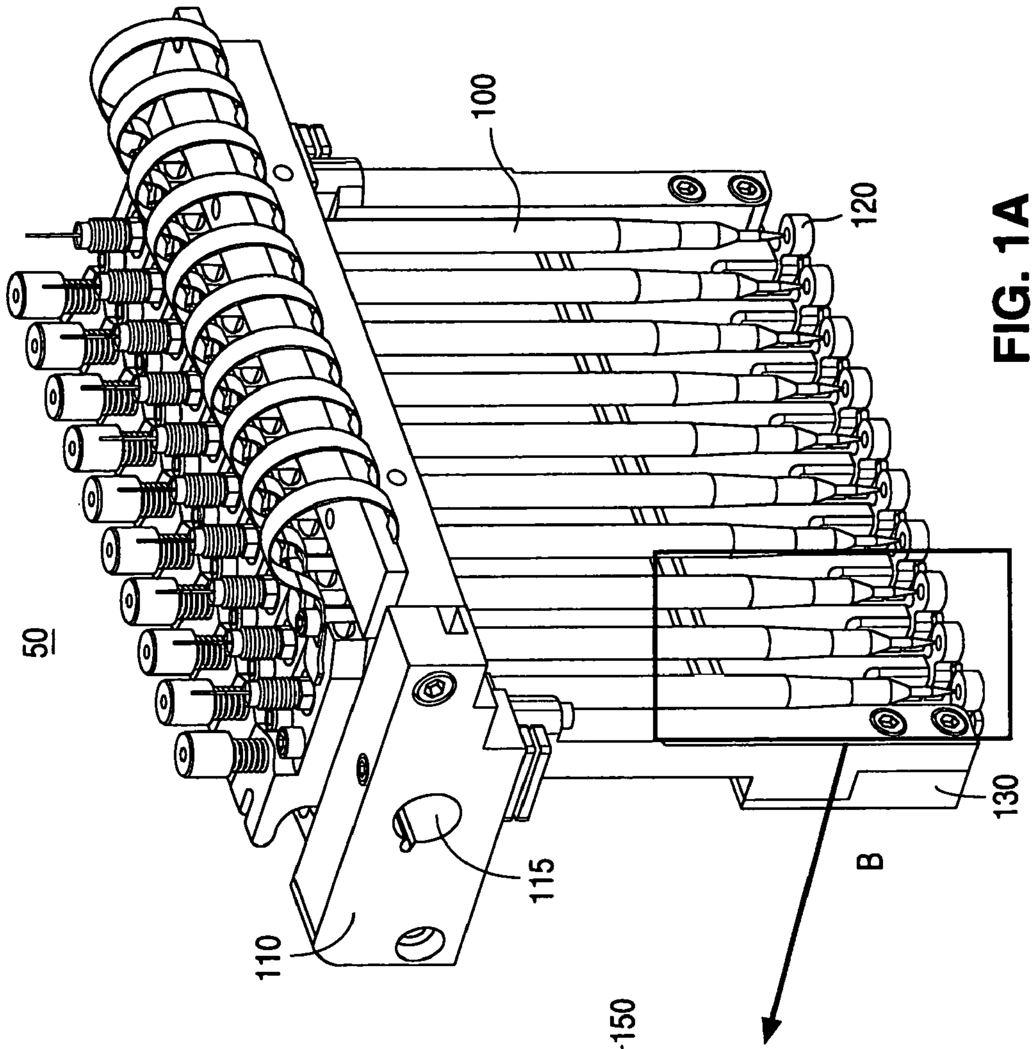
FIG. 1*a* is a perspective rear view of an assembly of electrospray probes in accordance with an embodiment of the invention.
Figure 2:
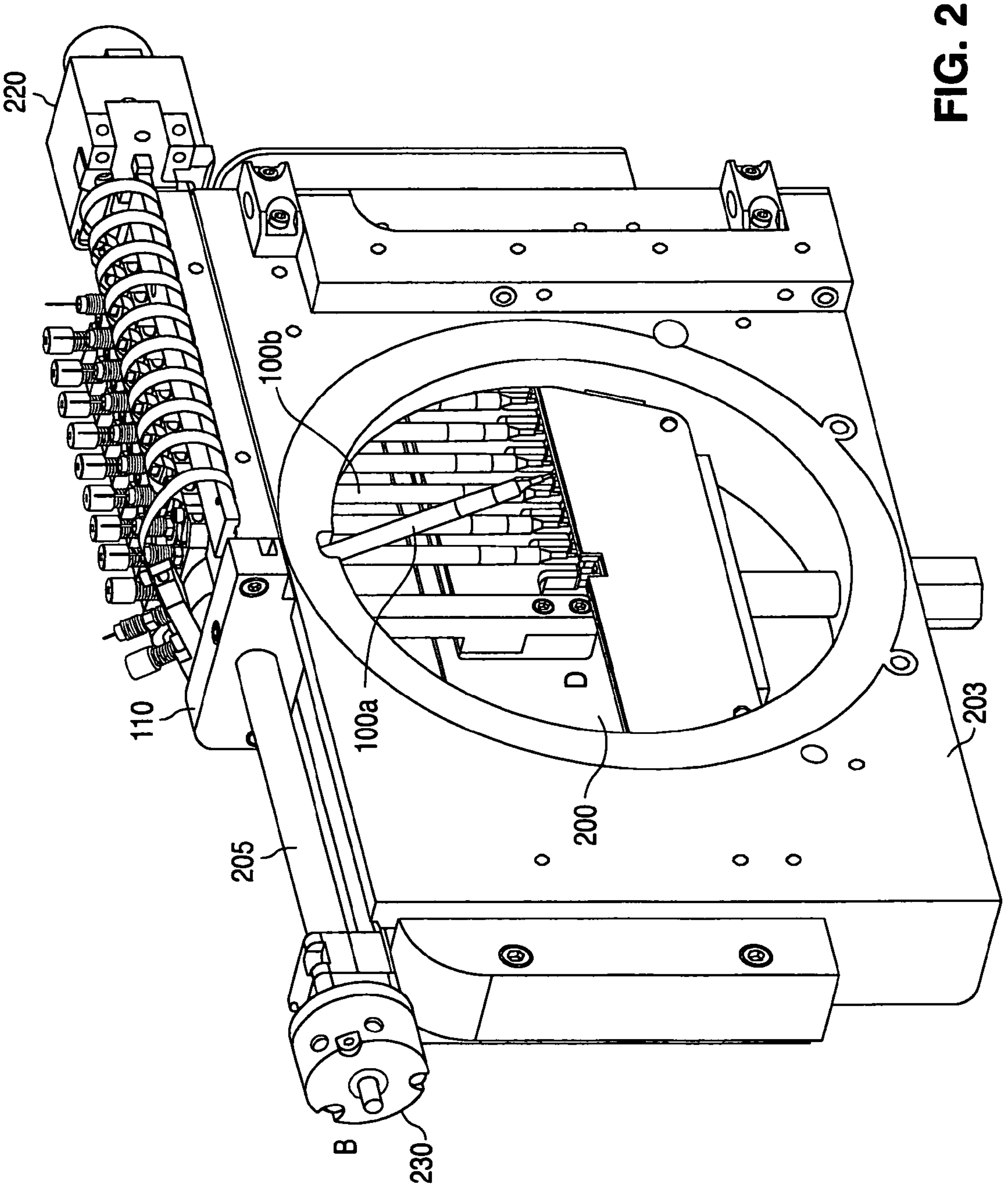
FIG. 2 is a perspective rear view of the assembly of FIG. 1*a* mounted onto the door of a mass spectrometer.

The present invention provides an electrospray probe assembly that eliminates the delay associated with rinsing and conditioning an electrospray probe used for repetitive analyses. Turning now to the Figures, a rear isometric view of an exemplary electrospray assembly 50 is illustrated in FIG. 1*a*. A plurality of electrospray probes 100 are mounted within a carriage assembly 110. Assembly 110 mounts through a bore 115 onto a shaft (described below). Depending upon the linear displacement of carriage assembly 110 with respect to the shaft, a feature on the shaft (also described below)

engages a desired probe 100. Because of this engagement, as the shaft rotates, a conditioned probe 100*a* is pivoted into an entry orifice 200 of a mass spectrometer (for illustration clarity, only a door 203 of the mass spectrometer is illustrated) as seen in FIG. 2. Conditioned probe 100*a* may then provide an ionized sample to the mass spectrometer. In FIG. 2, carriage 110 is shown mounted through bore 115 on an outer shaft (element 205). A linear actuator 220 may be used to displace carriage 110 along shaft 205. Similarly, a rotary actuator such as a pneumatic rotary actuator 230 may be used to rotate a probe 100 into entry orifice 200.

Figure 3A:
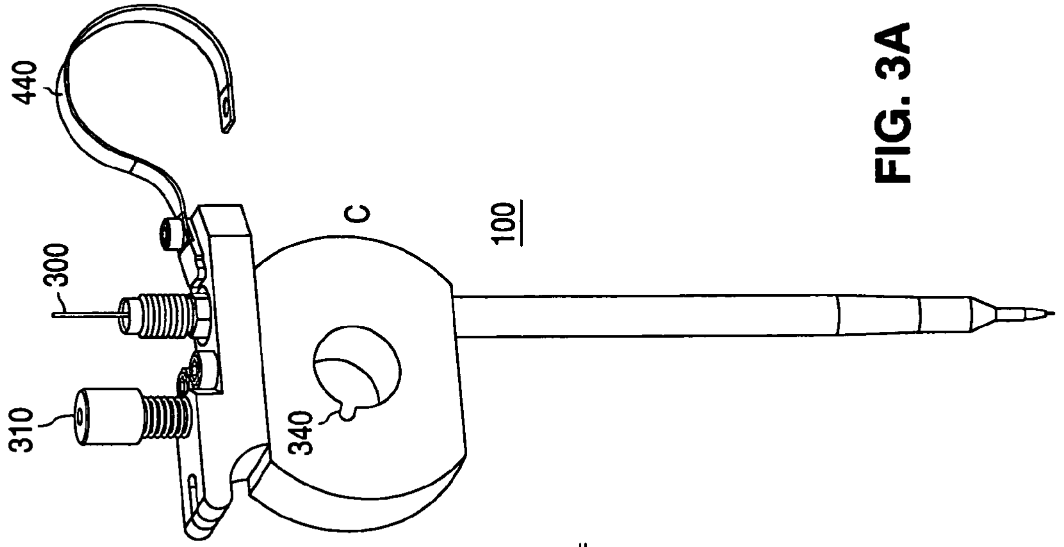
FIG. 3*a* is a perspective view of a single electrospray probe in accordance with an embodiment of the invention.
Figure 3B:
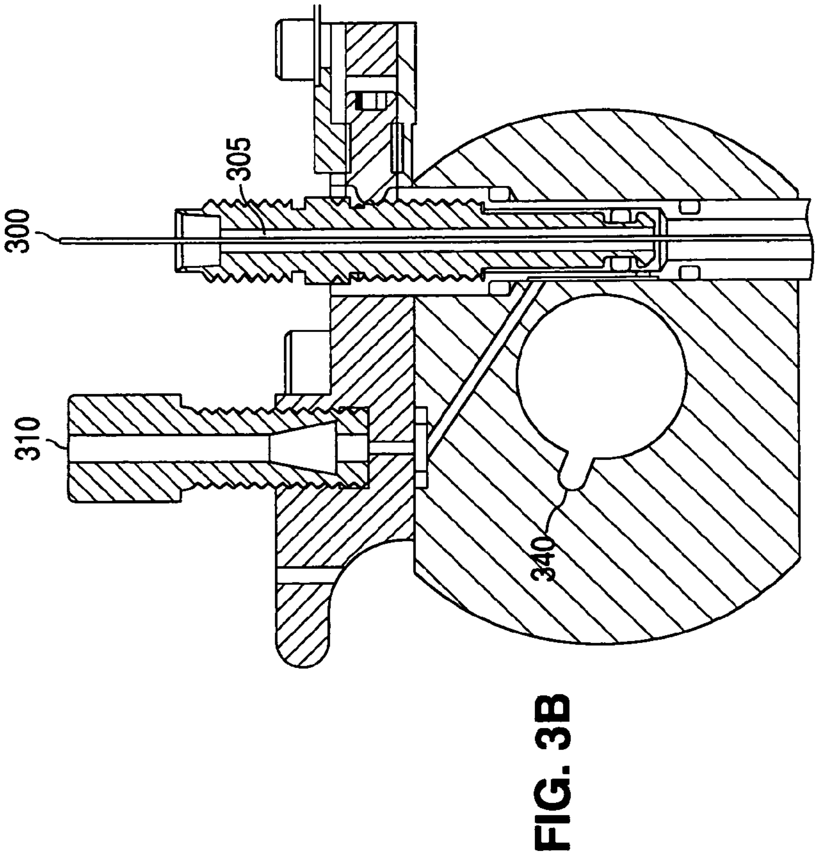
FIG. 3*b* is a cross-sectional view of a portion of the probe of FIG. 3*a*.

An isolated electrospray probe 100 is shown in FIG. 3*a*. As seen in the cross-sectional view in FIG. 3*b*, probe 100 includes a liquid inlet 300 in communication with a needle inside of a bore 305. Also in ultimate communication with bore 305 is a nebulizing gas inlet 310. Flexible tubing (not illustrated) couples to inlets 300 and 310 to allow for movement of probe 100. Through liquid inlet 300 and associated tubing, probe 100 may receive ultra pure water (UPW) or other suitable cleaning fluid for rinsing between samples. In addition, probe 100 may also receive samples through liquid inlet 300 for conditioning and testing purposes. Referring back to FIG. 2, note the advantages of this arrangement. While conditioned probe 100*a* is providing its sample to the mass spectrometer through entry orifice 200, other probes such as a probe 100*b* may be rinsed with UPW and conditioned with the sample to be tested. In this fashion, after conditioned probe 100*a* has finished providing its sample to the mass spectrometer, it may be rotated back into the inactive position so that assembly 110 can be moved along shaft 205 to position another conditioned probe into entry orifice 200. Thus, the conditioning and rinsing of probes 100 introduces no delay in the analysis performed by the mass spectrometer.

Figure 4:
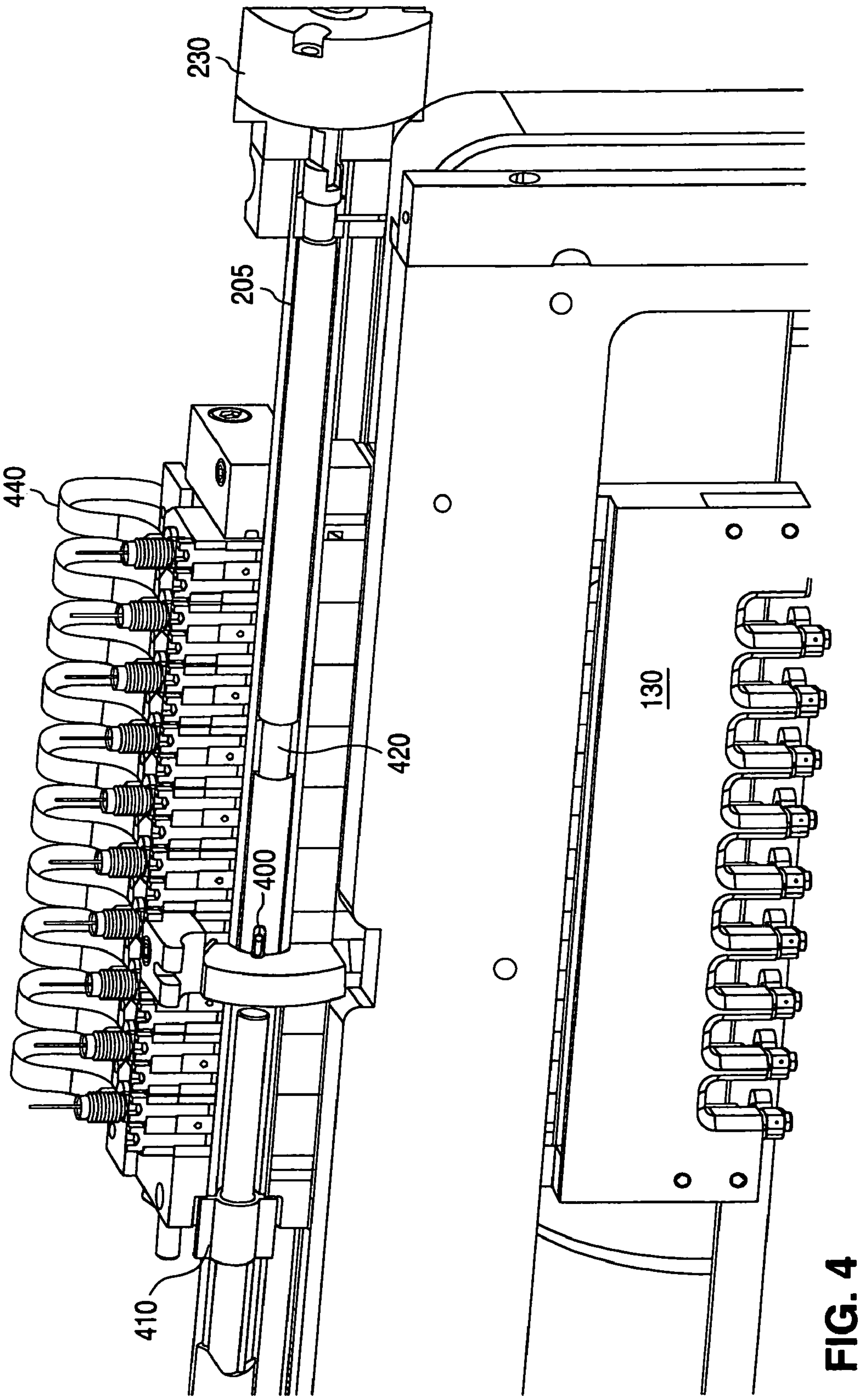
FIG. 4 is a perspective front view of the assembly of FIG. 3.

As seen in FIG. 3*a*, probe 100 may include a probe block including a feature so that probe 100 may be engaged and pivoted into entry orifice 200 of the mass spectrometer (FIG. 2). In this exemplary embodiment, the feature comprises a notch 340. Turning now to FIG. 4, a key 400 may be rotated by rotary actuator 230 to engage notch 340 and pivot the selected probe. As seen in FIG. 4, assembly 110 mounts through threaded adapter 410 onto a jackscrew 420. Outer shaft 205 may thus be hollow to receive jackscrew 420. As linear actuator 220 (FIG. 2) rotates jackscrew 420, assembly 110 displaces along outer shaft 205 to engage a conditioned probe with key 400. Rotary actuator 230 may drive an inner shaft 420 to rotate key 400. Rotation of inner shaft may be limited by a stop (not illustrated). Thus, the position of the stop would determine the angle at which the conditioned probe projects into entry orifice 200. By adjusting the position of the stop, the projection angle of the conditioned probe may be adjusted accordingly.

Figure 1B:
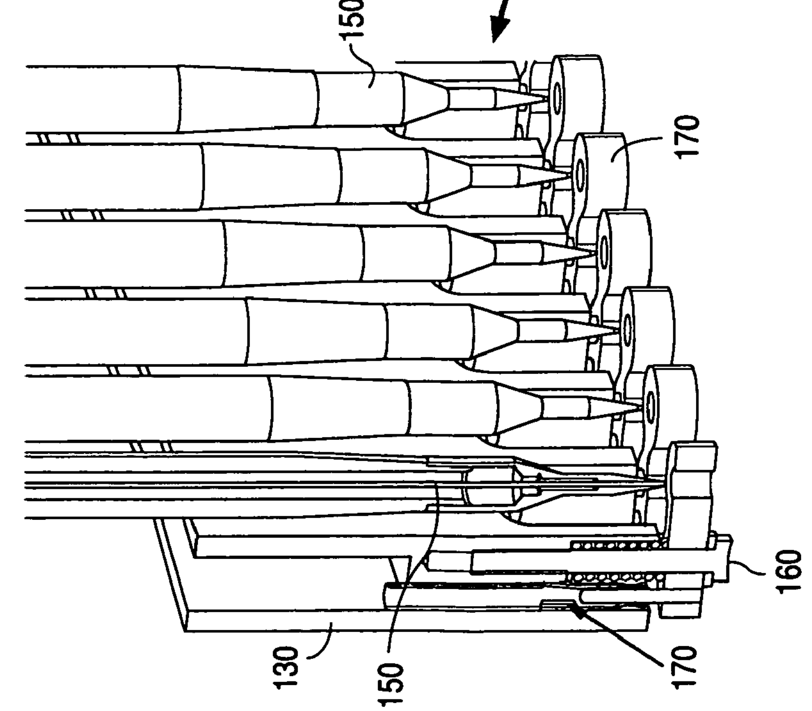
FIG. 1*b* is a close-up view, partially cutaway, of the needle portion of the electrospray probes of FIG. 1*a*.

Each probe 100 may be grounded through a corresponding ground contact 440, which should be resilient to accommodate pivoting of the corresponding probe. It will be appreciated that another potential besides ground may be achieved through appropriate biasing of ground contact 440. As seen in FIG. 1*a*, counter electrodes 120 for the probes may be mounted in a rack 130. Turning now to FIG. 1*b*, a close-up of a needle portion 150 for each probe 100 is shown. The height of counter electrodes 120 with respect to rack 130 may be adjusted using a screw 160. In addition, a contact 170 may be provided to maintain electrical contact between rack 130 and counter electrodes 120 despite the mobility of counter electrodes 120. For illustration clarity, only a single needle portion 150 is shown in cross-section. As seen in FIG. 2, a ground plane may shield counter electrodes 120 from the probe 100*a*, which is pivoted through mass spectrometer entry orifice 200. To accommodate this pivoting, the ground plane may be notched as shown.

Figure 5:
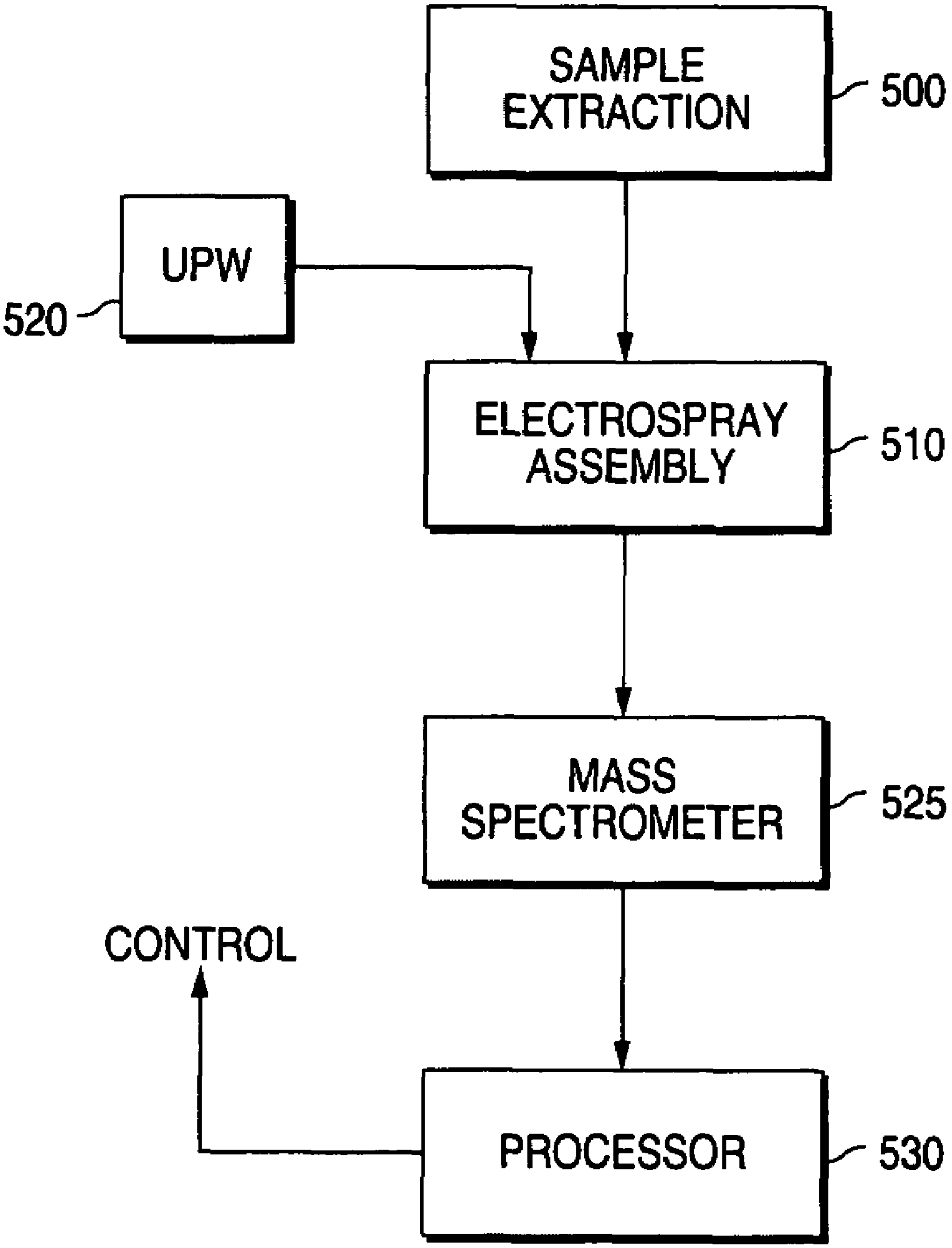
FIG. 5 is a block diagram of an automated mass spectrometry system in accordance with an embodiment of the invention.

Although the electrospray assembly described with respect to FIGS. 1*a* through 4 may be advantageously used with conventional mass spectrometers, it also enhances the use of the automated mass spectrometer disclosed in U.S. Ser. No. 10/004,627. A block diagram overview of an embodiment of such an automated mass spectrometer system incorporating the electrospray assembly disclosed herein is shown in FIG. 5. A sample extraction, dilution, and spiking module 500 is adapted to extract a sample and spike the extracted sample. If necessary, either the sample, the spike, or the equilibrated spike/sample mixture may be diluted. The type of spike depends upon the analyte being characterized in the sample. Certain analytes such as Cu are amenable to isotopic dilution analysis such that the spike would be a known amount of Cu having an altered isotopic ratio. Other analytes such as complex molecules are not as amenable to an isotope dilution mass spectrometer (IDMS) analysis because it would be too expensive to synthesize a complex molecule having an altered isotopic ratio. Alternatively, certain analytes such as Co are virtually monoisotopic such that there is no isotopic ratio to alter. In such a case an internal standard type of analysis may be performed as will be explained further herein. Regardless of whether an IDMS or internal standard analysis is being performed, module 500 mixes the spike and sample and allows the mixture to equilibrate before delivering the mixture to electrospray interface 510.

Interface 510 may be constructed as discussed with respect to FIGS. 1*a* through 4. To provide a rinsing solution, electrospray interface 510 may receive UPW from a UPW source 520. Electrospray interface 510 ionizes the spike/sample mixture received from extraction module 500 so that the ions may be characterized by a mass spectrometer 525. As discussed analogously with respect to FIG. 2, while a conditioned probe is providing its ions to the mass spectrometer, additional probes may be rinsed (from source 520) and conditioned with sample/spike mixture from extraction module 500.

Mass spectrometer 525 measures a response for both the sample and the spike. By forming a ratio of these responses, the concentration of the analyte in the sample may be characterized. Advantageously, this ratio will cancel out instrument drift and other inaccuracies, thereby providing precision and accuracy. Moreover, the ratio method just described is independent of whether an internal standard or IDMS method is utilized. Should an internal standard be used as the spike, it need merely have a sufficiently similar chemical behavior through assembly 510 and mass spectrometer 525.

Processor 530 controls the configuration of module 500 and electroprobe interface 510 to maintain an automated operation. For example, processor 530 would control actuators 220 and 230 of FIG. 2 as necessary.

The above-described embodiments of the present invention are merely meant to be illustrative and not limiting. For example, rather than linearly displace probes 100 with respect to shaft 420 so that key 400 engages a conditioned probe 100*a*, these probes may be arranged on a wheel in a semicircular arrangement. By rotating the wheel, a selected probe may be engaged with a feature that pivots the selected probe into a mass spectrometer entry orifice. It will thus be obvious to those skilled in the art that various changes and modifications may be made without departing from this invention in its broader aspects. Accordingly, the appended claims encompass all such changes and modifications as fall within the true spirit and scope of this invention.

What is claimed is:

1. An analytical apparatus, comprising:

a carriage; and a plurality of electrospray probes pivotably mounted on the carriage, wherein movement of the carriage engages a feature with a selected one of the electrospray probes whereby movement of the feature pivots the selected one of the electrospray probes with respect to the carriage.

2. The analytical apparatus of claim 1, further comprising a shaft, wherein the carriage is movably mounted on the shaft.

3. The analytical apparatus of claim 2, wherein the feature is a key on the shaft, and wherein each electrospray probe includes a notch configured to be engaged by the key.

4. The analytical apparatus of claim 3, further comprising a rotary actuator operable to rotate the shaft.

5. The analytical apparatus of claim 2, further comprising an actuator operable to move the carriage.

6. The analytical apparatus of claim 5, wherein the actuator is a rotary actuator operable to move the carriage by rotating a jackscrew.

7. The analytical apparatus of claim 1, further comprising an automated mass spectrometer comprising:

a sample extraction and spiking module operable to extract a sample and spike the sample with a spike to form an equilibrated mixture, a rinsing source;

a mass spectrometer; and a processor configured to control the module to provide the equilibrated mixture to a conditioned one of the electrospray probes and to control movement of the carriage and the feature such that the conditioned one of the electrospray probes provides an ionized version of the equilibrated mixture to the mass spectrometer, the processor being further configured to control the rinsing of another one of the electrospray probes using a rinsing solution from the rinsing source to form a rinsed electrospray probe, the processor being further configured to control the module to condition the rinsed electrospray probe with additional equilibrated mixture to provide an additional conditioned electrospray probe.

8. The automated mass spectrometer of claim 7, wherein the processor is configured to control movement of the carriage and the feature such that the additional conditioned electrospray probe provides an ionized version of the additional equilibrated mixture to the mass spectrometer.

9. The automated mass spectrometer of claim 8, wherein the carriage is mounted on a shaft such that rotation of a jackscrew moves the carriage on the shaft, the processor being configured to control a rotary actuator driving the jackscrew to control movement of the carriage.

10. A method of using an electrospray assembly including a plurality of electrospray probes mounted on a carriage, comprising:

conditioning a selected one of the electrospray probes;

moving the carriage such that a feature engages the selected one of the electrospray probes; and moving the feature such that the selected one of the electrospray probes pivots into a mass spectrometer bore.

11. The method of claim 10, wherein the feature is a key on a shaft, and wherein the movement of the feature comprises rotating the shaft.

12. The method of claim 10, further comprising:

emitting ions from the pivoted electrospray probe into the mass spectrometer bore.

13. The method of claim 12, further comprising:

while the ions are emitted, conditioning another selected one of the electrospray probes;

after the ions have finished emitting; moving the carriage such that the feature engages the another selected one of the electrospray probes; and moving the feature such that the another one of the electrospray probes pivots into the mass spectrometer bore.

14. The method of claim 10, wherein the carriage mounts on a shaft, and wherein movement of the carriage comprises displacing the carriage along the shaft.

15. An analytical apparatus, comprising:

a plurality of electrospray probes;

means for moving the plurality of electrospray probes such that a selected one of the electrospray probes is positioned with respect to an mass spectrometer bore; and means for moving the selected one of the electrospray probes into the mass spectrometer bore.

16. The analytical apparatus of claim 15, further comprising means for rinsing and conditioning the electrospray probes.

* * * * *